United States Patent
Hiscock et al.

(10) Patent No.: US 9,900,221 B2
(45) Date of Patent: Feb. 20, 2018

(54) CONTROLLING A TOPOLOGY OF A NETWORK

(71) Applicant: HEWLETT-PACKARD DEVELOPMENT COMPANY, L.P., Houston, TX (US)

(72) Inventors: James S. Hiscock, Rockport, MA (US); Vishwas Manral, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 110 days.

(21) Appl. No.: 14/764,093

(22) PCT Filed: Jan. 30, 2013

(86) PCT No.: PCT/US2013/023792
§ 371 (c)(1),
(2) Date: Jul. 28, 2015

(87) PCT Pub. No.: WO2014/120145
PCT Pub. Date: Aug. 7, 2014

(65) Prior Publication Data
US 2015/0365314 A1 Dec. 17, 2015

(51) Int. Cl.
*H04L 12/24* (2006.01)
*H04L 12/751* (2013.01)

(52) U.S. Cl.
CPC ............ *H04L 41/12* (2013.01); *H04L 41/14* (2013.01); *H04L 45/02* (2013.01); *H04L 41/145* (2013.01); *H04L 41/16* (2013.01)

(58) Field of Classification Search
CPC . H04L 41/12; H04L 43/0888; H04L 41/0896; H04L 41/0813; H04L 41/0823; H04L 41/0873; H04L 41/14; H04L 41/16; H04L 41/142; H04L 41/145
See application file for complete search history.

(56) References Cited

U.S. PATENT DOCUMENTS

| | | | |
|---|---|---|---|
| 7,693,966 B2* | 4/2010 | Schmid | H04L 41/0806 709/220 |
| 8,762,505 B2* | 6/2014 | Kutan | G06F 9/5061 703/1 |
| 2002/0030864 A1 | 3/2002 | Chaudhuri et al. | |
| 2003/0236875 A1 | 12/2003 | Green et al. | |
| 2008/0219268 A1 | 9/2008 | Dennison | |
| 2008/0239956 A1 | 10/2008 | Okholm et al. | |
| 2008/0281947 A1 | 11/2008 | Kumar | |
| 2011/0040860 A1 | 2/2011 | DeCusatis et al. | |
| 2012/0215891 A1 | 8/2012 | Lessmann et al. | |

(Continued)

OTHER PUBLICATIONS

Extended European Search Report, EP Application No. 13873958.6, dated Aug. 22, 2016, pp. 1-8, EPO.

(Continued)

*Primary Examiner* — Raj Jain
(74) *Attorney, Agent, or Firm* — Fabian VanCott (57) ABSTRACT

Controlling a topology of a network includes determining a desired topology of a network, comparing the desired topology to a current topology of the network, and controlling the current topology with role assignments and parameter assignments to network components in the current topology to implement the desired topology with the current network components.

22 Claims, 6 Drawing Sheets (56) References Cited

U.S. PATENT DOCUMENTS

| | | |
|---|---|---|
| 2012/0226824 A1 | 9/2012 | Trnkus et al. |
| 2012/0254338 A1 | 10/2012 | Agarwal et al. |
| 2013/0004170 A1 | 1/2013 | Reina et al. |
| 2013/0191688 A1* | 7/2013 | Agarwal .................. H04L 41/12 714/32 |
| 2015/0365314 A1* | 12/2015 | Hiscock .................. H04L 45/02 370/389 |

OTHER PUBLICATIONS

"Cooperative Control Wireless LAN Architecture," White Paper, Aerohive Networks, May 23, 2012.

"Distributed? Centralized? Both?" Cisco Blog, Architect & DE Discussions, Jul. 2012. <http://blogs.cisco.com/getyourbuildon/distributed-centralized-both/>.

Tootoonchian et al., "HyperFlow: A Distributed Control Plane for OpenFlow," Apr. 7, 2010. <http://static.usenix.org/event/inm10/tech/full_papers/Tootoonchian.pdf>.

Korean Intellectual Property Office, International Search Report and Written Opinion for PCT/US2013/023792 dated Oct. 29, 2013 (11 pages).

\* cited by examiner

CONTROLLING A TOPOLOGY OF A NETWORK

BACKGROUND

To route packets from one network component to another network component, packets are sent through routers and switches. A router generally connects layer 2 networks that make up a larger interconnected network. The packet is sent to the router of the layer 2 network where the packet originates. The router will send the packet to a second router, which will either forward the packet to yet another router if the packet's destination is not part of the layer 2 network associated with the second router, or the second router puts the packet onto its layer 2 network if its associated layer 2 network contains the packet's destination. A control plane is a part of a router's architecture that controls how the packet is forwarded. Generally, a control plane has a routing table that lists the components of the interconnected network and their locations. The control plane consults the routing table when determining how to forward the packet. Additionally, the control plane follows a routing protocol that specifies how routers communicate with other routers.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Control plane implementations use network topologies to forward packets to the appropriate destinations in the network. A network topology includes the logical connections established between the network components. Several types of control plane implementations exist. Such control plane implementations includes distributed in path control plane implementations, such as Rapid Spanning Tree Protocol (RSTP) at the layer 2 network; centralized off path control plane implementations, such as OpenFlow where a program controls several routers simultaneously; and hybrid implementations that run both RSTP and OpenFlow. But, each of these implementations has their limitations. Traditional distributed control plane implementations are quick to react and scale well, but are difficult to change, have limited topology visibility, and provide fewer control options. Centralized control plane implementations like OpenFlow are quicker to change, provide more control options, but have scalability and performance challenges.

Other centralized control plane implementations include traditional network management, where a central off-path controller controls parameters of the distributed/on-path controller functions. This implementation works best for long term traffic needs, but does not react at individual communication stream speeds and the distributed control planes are difficult to add or modify. Another centralized control plane implementation includes overlay management where a central off-path controller controls encapsulation at the entrance and exit points of a layer 2 network to create the path that meets the traffic needs utilizing the topology created by the distributed/on-path controller functions. This implementation is still limited by the distributed control planes in place. Also, an underlay management has a central off-path controller that micromanages switch forwarding to meet the traffic needs. An example of this type of implementation is OpenFlow. This type of implementation has trouble scaling and has slower reaction times when remote decisions are made.

The principles described herein include a method for controlling the topology of a network by changing the control plane implementations to best meet the specifications of an application. Such a method includes determining a desired topology of a network, comparing the desired topology to a current topology of the network, and controlling the current topology with role assignments and parameter assignments to network components in the current topology to implement the desired topology with the current network components. The role assignments include the jobs that each network component is to perform to implement the desired topology. Such roles may include protocol plane roles, control plane roles, or others that the network components will participate in the desired topology, or combinations thereof. The parameters include lower level implementations for executing the role assignments. For example, the parameter assignments may include link aggregation grouping parameters, port state parameters, quality of service parameters, other parameters, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
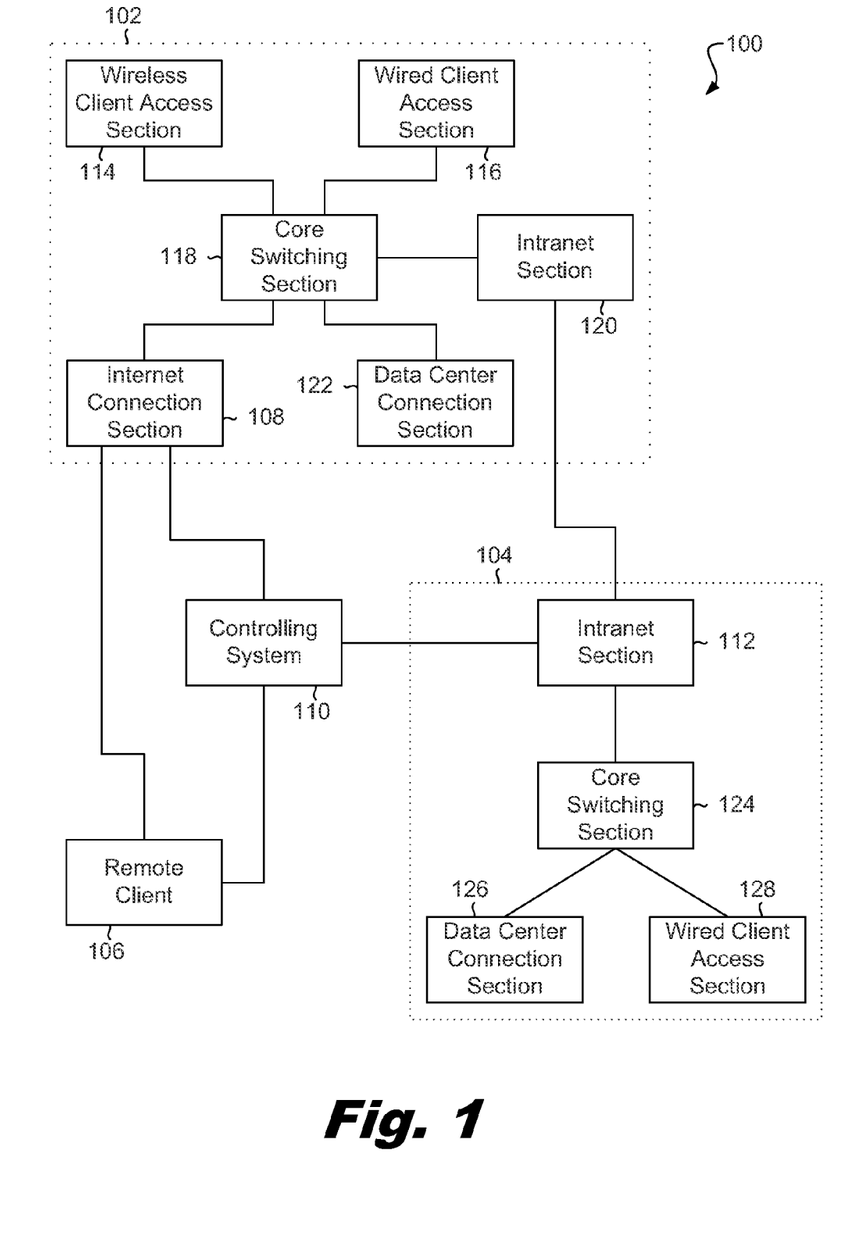
FIG. 1 is a diagram of an example of a network according to the principles described herein.

FIG. 1 is a diagram of an example of a network (100) according to the principles described herein. In this example, the network (100) has a first network (102), a second network (104), and a remote client (106). The first network (102) has an internet connection section (108) that is in communication with a controlling system (110). Also, the second network (104) has an intranet section (112) that is in communication with the controlling system. Further, the controlling system (110) is also in communication with the remote client (106).

In addition to the internet connection section (108), the first network (102) has a wireless access section (114), a wired client access section (116), a core switching section (118), an intranet section (120), and a data center connection section (122). Also, the second network (104) has a core switching section (124), a data center connection section (126), and a wired client access section (128). While this example has been described with reference to an interconnected network (100), any appropriate network type may be used in accordance with the principles described herein. In alternative examples, the network is a layer 2 network, a data center network, a storage network, a corporate network, local area network, a virtual area network, another type of network, or combinations thereof.

The controlling system (110) may obtain a description of a desired network topology for carrying out a specific application or general applications on the network. The controlling system (110) may request the description, receive the description from user input, or determine the description based on a request to perform a specific application, other mechanisms, or combinations thereof. In response to obtaining the description, the controlling system (110) reads the description to determine how to construct the desired topology. Additionally, the controlling system (110) determines the current topology of the network and compares the current topology of the network (100) to the desired topology.

The controlling system (110) discovers each of the sections from the first and second networks (102, 104), the remote client (106), and how these sections are connected to each other. The discovery process may be accomplished by probing and listening to sections of the network (100), reading network management data base information, consulting administrator input, using network planning programs, other mechanisms, or combinations thereof. Further, the controlling system (110) may consult external resources, such as the internet or other resources, to determine information about the current topology of the network (100).

In some examples, the controlling system (110) consults external resources to determine how to construct the desired topology. For example, multiple hardware devices and programs may be capable of implementing the desired topology. The controlling system (110) may reference resources external to the network (100) to determine if at least some of the existing programs and hardware already in the current topology are compatible for implementing the desired topology.

One mechanism for comparing the current topology with the desired topology is filling out templates with useful information about both the current topology and the desired topology. The templates can organize the obtained information about the current topology and the desired topology in such a way that makes the differences between them apparent. As a result, the controlling system (110) can compare the templates to each other to determine if the current topology and the desired topology are different. If the current and desired topologies are different, the controlling system can further determine if the current topology is capable of supporting the desired topology. If not, the controlling system may request or actively acquire additional resources for the current topology to implement the desired topology.

Further, the controlling system (110) determines what type of control planes to implement on the first and second network (102, 104) and their associated sections. In response to determining the desired control plane implementations, the controlling system (110) assigns roles to the various network components to implement the control planes across the network. Each of the assigned roles may be different for the first and the second networks (102, 104) as well as for the sections within each of the first and the second networks (102, 104).

The controlling system (110) also modifies discovered deployed central and distributed control planes as appropriate to carry out the control plane implementations. Further, if desired, the controlling system (110) draws upon new network resources to implement the desired topology as appropriate to implement the desired topology. After establishing the desired network topology, the network is monitored to make further adjustments as appropriate.

After discovering the network topology and capabilities, the controlling system (110) determines which type of centralized and distributed control planes meet the specifications of the desired topology. For example, the controlling system (110) may determine to use traditional RSTP distributed control planes for both the wired client access sections (116, 128) in both the first and second networks (102, 104). An overlay management model may be selected for the wireless client access section (114) of the first network (102). The controlling system (110) may also select a traditional internet protocol (IP) control plane and firewall for the first network's internet connection section (108).

Further, the controlling system (110) may select a hybrid model for the switching core sections (118, 124) to use both RSTP and OpenFlow control plane implementations. The intranet sections (112,120) may be assigned a pure OpenFlow control plane since the intranet topology is simple and helps virtualize the data centers across the first and second networks (102, 104). A hybrid model may also be implemented for the data center connection sections (122, 126) where unique protocols are used for dedicated bandwidth, data center bridging methods are utilized, and OpenFlow is used to help provide virtualization across the first and second networks (102, 104).

Such a topology as described above may be used to create virtual local area networks (VLANs). Such VLANs may include a guest VLAN to the second network (104) that provides internet connectivity, while still limiting access to the first network (102); a voice VLAN; a corporate data VLAN; at least one mobility VLAN to carry encapsulated traffic from the wireless client access section (114); a set of VLANs for connecting the data centers connection sections (122, 126) in first and second networks (102, 104) to help create the single virtualized data center; and a dedicated supervisor VLAN for the central controller to communicate with interconnected network devices. Multiple Spanning Tree Protocol (MSTP) may be implemented to provide separate spanning trees to each VLAN and control the topology of each VLAN to best meet the traffic needs.

The controlling system (110) can use any appropriate information available to implement the desired topology, such as a general description of the desired topology and network services, network section descriptions for each of the network functional areas, and the type of traffic services desired. The control plane implementation for each network (102, 104) and/or section may include policies that account for different control plane implementation types, specific VLAN rules, quality of service rules, and interconnection methods to other sections of the network.

A general description of the desired topology is used to create the initial structure, set parameters in existing control plane implementations, and to deploy any appropriate additional control plane implementations. The controlling system (110) may also use the description of network loads or unique network circumstances to choose and adjust control plane elements to handle these network loads or circumstances. Such information can be used by the controlling system (110) to establish control plane configurations to support long and short term network circumstances.

Figure 2:
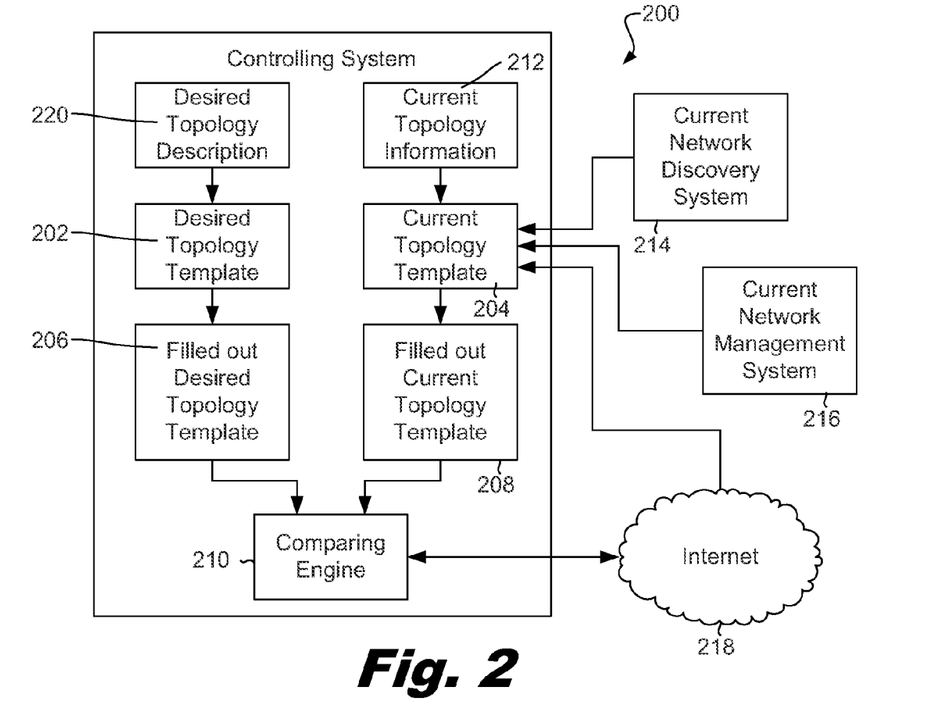
FIG. 2 is a diagram of an example of a controlling system according to the principles described herein.

FIG. 2 is a diagram of an example of a controlling system (200) according to the principles described herein. In this example, the controlling system (200) leverages existing information from different sources to fill out topology templates (202, 204) that describe the current and desired network topologies.

The controlling system (200) includes mechanisms for filling out the desired topology template (202) to express the desired state of the network and a current topology template (204) to express the current state of the network. The filled out desired topology templates (206) are compared to the filled out current topology templates (208) with a comparing engine (210) to determine differences between the desired topology and the current topology.

Information about the current network topology is received or retrieved by the controlling system (200). This information can come from a variety of sources to fill out the desired and/or current topology templates (202, 204). Information to fill out the current topology template (204) can come from current topology information (212) already stored in the controlling system (200), current network discovery systems (214), current network management systems (216), the Internet (218), other sources, or combinations thereof. Information to populate the desired topology template (202) is filled out with information from a desired topology description (220), which the controlling system (200) either receives from another source or determines internally based on applications that the network is to perform. The structures of the desired topology and the current topology templates (202, 204) have similar formats to help the comparing engine (210) to make a comparison.

While this example has been described with reference to specific information sources to fill out either the desired topology template or the current topology template, any appropriate source that contains information useful for filling out either the desired topology or the current topology templates may be used in accordance with the principles described herein.

Figure 3:
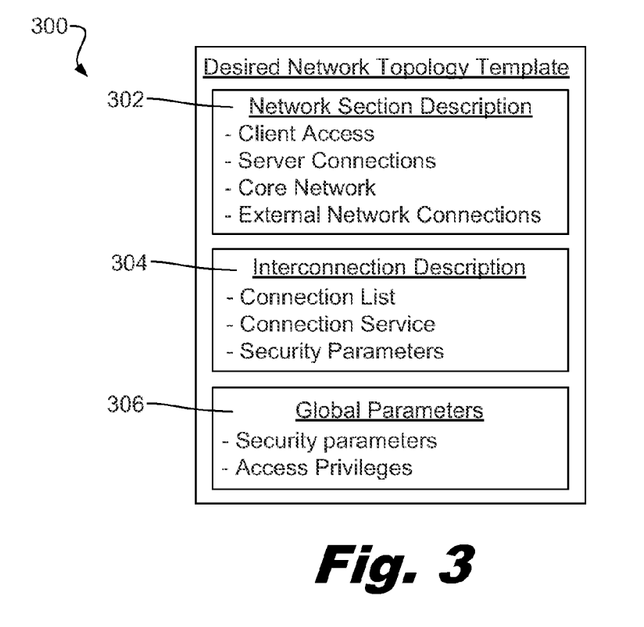
FIG. 3 is a diagram of an example of a desired network topology template according to the principles described herein.

FIG. 3 is a diagram of an example of a desired network topology template (300) according to the principles described herein. In this example, the desired topology template (300) includes a network section list (302), a section interconnections description (304), and global parameters (306). The desired topology template (300) is initially filled out using a description of the desired network topology. The desired network topology can be represented in a range of styles from general rules to device and interconnection specifics. The transformation function that reads the desired network topology and fills out the desired network topology template (300) contains functionality to translate general rules into specific device implementation parameters settings that will be stored in the desired topology template (300). If the desired network topology description contains more specifically stated details, then less translation may be used to fill out the desired topology template (300).

Likewise, the current topology template (204, FIG. 2) also includes a network section list, a section interconnections description, and global parameters. This information can be gathered from at least one other data collection entities, gleaned from the network discovery communications, or a combination of these methods. This information is used to fill out the current network section description, interconnection descriptions, and global parameters.

While the example of FIG. 3 describes the desired network topology template with reference to a specific number of sections and section types, any appropriate number of sections or section types may be used in accordance with the principles described herein. Further, while the examples above have been described with reference to desired topology templates that are similar to current network topology templates, any appropriate templates for either the desired topology template or the current topology template may be used in accordance with the principles described herein. For example, the desired topology template may be dissimilar to the current topology template.

Figure 4:
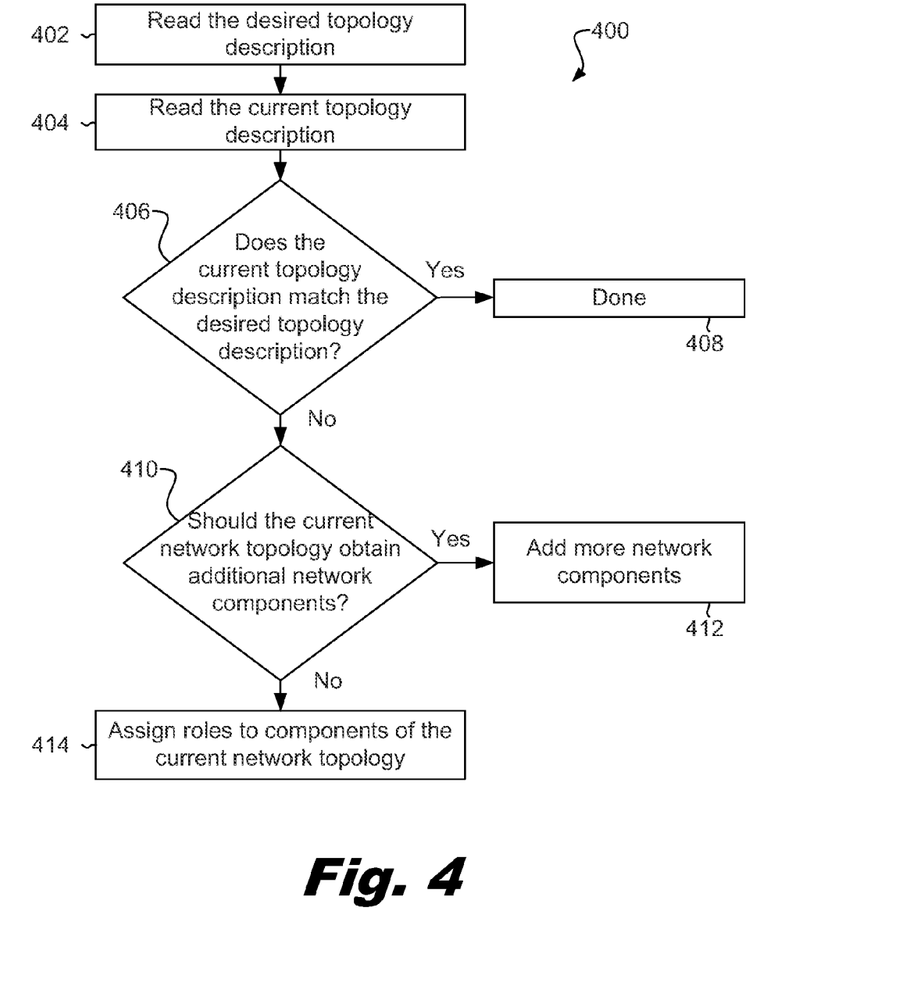
FIG. 4 is a diagram of an example of a flowchart of a process for gathering information according to the principles described herein.

FIG. 4 is a diagram of an example of a flowchart (400) of a process for gathering information according to the principles described herein. In this example, the process includes reading (402) a desired topology description. The desired topology description may be obtained from an outside source, or the controlling system may develop the desired topology description based on at least one application that the network is to perform in some examples, the controlling system monitors the types of the applications historically processed with the network and develops a description of a desired topology that is well suited or better suited than the current topology to process such applications.

The process also includes reading (404) a current topology and determining (406) whether the current topology description and the desired topology description match if the desired topology and the current topology match, then the process ends (408). On the other hand, if the desired topology and the current topology do not match, the process will further determine (410) whether the current topology should obtain additional network components to implement the desired topology. If more network components are desired, the process includes adding (412) more network components. The additional network components may include hardware, programs, virtual components, other components, or combinations thereof.

The process also includes assigning (414) roles to the components of the current network topology to implement the desired topology. Such roles may include forwarding control plane policies, other roles, or combinations thereof.

Figure 5:
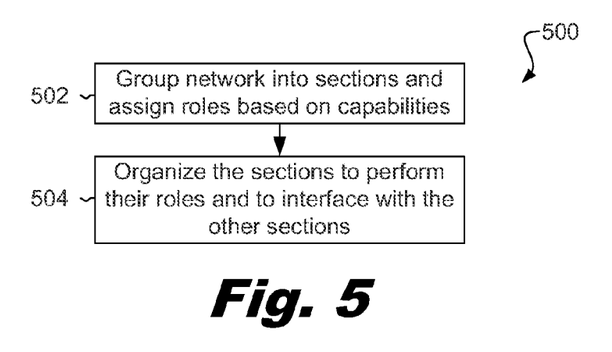
FIG. 5 is a diagram of an example of a method for assigning roles to network components according to the principles described herein.

FIG. 5 is a diagram of an example of a method (500) for assigning roles to network components according to the principles described herein. In this example, the method (500) includes grouping (502) the network into sections and assigning roles to those sections based on the section's capabilities. Further, the process includes organizing (504) the sections to perform their roles and to interface with the other sections.

While this example is described with a reference to specific mechanisms for assigning roles to network components, any appropriate mechanism for assigning roles to network components may be used in accordance with the principles described herein. For example, the assignments may be based on individual network component abilities instead of section abilities or combinations thereof.

Figure 6:
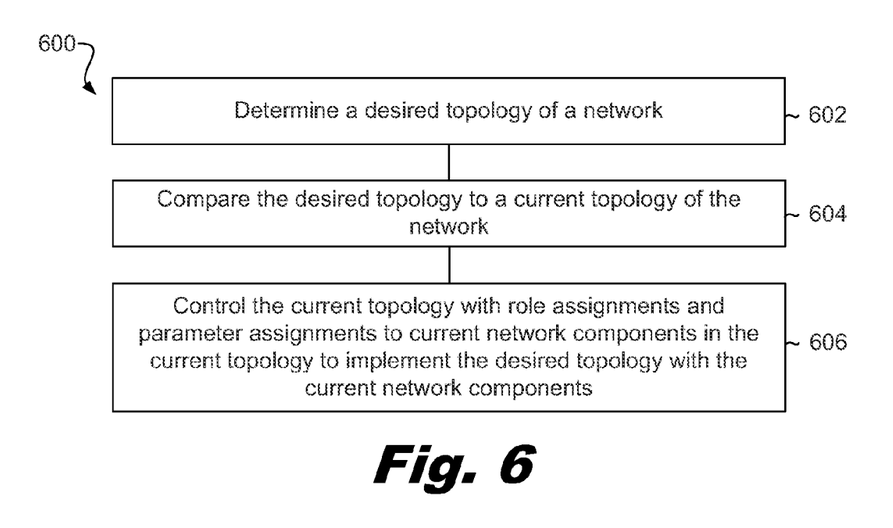
FIG. 6 is a diagram of an example of a method for controlling a topology of a network according to the principles described herein.

FIG. 6 is a diagram of an example of a method (600) for controlling a topology of a network according to the principles described herein. In this example, the method (600) includes determining (602) a desired topology of a network, comparing (604) the desired topology to a current topology of the network, and controlling (606) the current topology with roles assignments and parameter assignments to network components in the current topology to implement the desired topology with the current network components.

The method may include adding additional network components to the current topology to implement the desired topology. The network components may be any network component that affects the topology of the network. For example, the network component may be a control plane element, a router, a switch, another network component, or combinations thereof.

Determining the desired topology may include receiving at least part of a description of a desired topology from another source. In some examples, the information about the desired topology is gathered from at least one source that contains information about the device that are capable of implementing the desired topology. Such information may be used to fill out a desired topology template. Additionally, information about the current network topology may be gathered from sources that contain information pertaining to the current topology of the network. This information may also be used to fill out a current topology template. The desired topology template and the current topology template may be compared to one another to determine whether the desired topology and the current topology match.

If the desired topology and the current topology do not match, the current topology can be modified to implement the desired topology with the current components. The network components may be assigned roles that cause the current topology to implement a distributed in path control implementation, a centralized off path control implementation, another implementation, or combinations thereof. For example, one of the network's sections may be caused to implement a distributed in path control implementation, while another section is caused to implement a centralized off path control implementation, while yet another section is caused to implement yet another type of implementation, and so forth.

Figure 7:
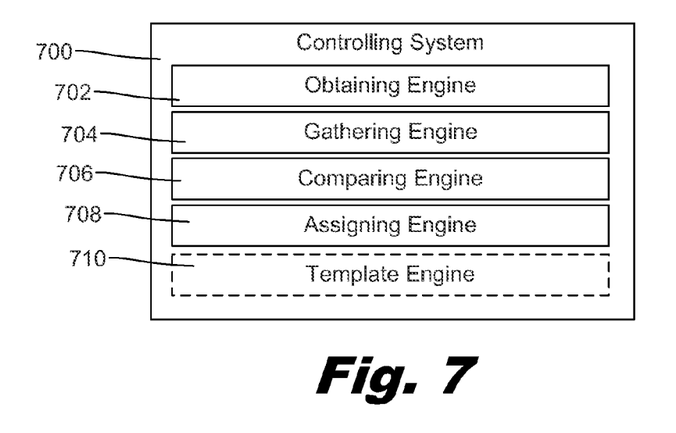
FIG. 7 is a diagram of an example of a controlling system according to the principles described herein.

FIG. 7 is a diagram of an example of a controlling system (700) according to the principles described herein. The controlling system (700) includes an obtaining engine (702), a gathering engine (704), a comparing engine (706), and an assigning engine (708). In the example of FIG. 7, the controlling system (700) also includes a template engine (710). The engines (702, 704, 706, 708, 710) refer to a combination of hardware and program instructions to perform a designated function. Each of the engines (702, 704, 706, 708, 710) may include a processor and memory. The program instructions are stored in the memory and cause the processor to execute the designated function of the engine.

The obtaining engine (702) obtains a description about the desired topology. The description is obtained through passively receiving the description from another source, actively requesting the description from another source, developing the description in response to historical applications executed with the network, developing the description in response to a job to be executed with the network, other mechanisms, or combinations thereof. In some examples, the description is continuously being developed on an ongoing basis to keep the network operating at an optimal efficiency.

The gathering engine (704) gathers information about the desired topology and/or the current topology. For the desired topology, the gathering engine (704) can gather information from the description, the source of the description, sources external to the network, other sources, or combinations thereof. In some examples, the gathering engine (704) also infers facts about the desired topology based on the description or gathers information from other sources that are not explicitly described in the description or found in the gathered information. Such inferences allow the gathering engine (704) provide more detail about the desired topology.

The information about the current topology may be gathered from information already stored in the controlling system (700), information stored in the network, network discovery devices, network storage devices, network management devices, routers, switches, sources external to the network, the internet, other sources, or combination thereof. The gathering engine (704) may also infer missing data about the current topology of the network as appropriate.

The template engine (710) populates the information and/or inferences from the gathering engine (704) into templates to describe the desired topology and the current topology. The templates for the desired topology and the current topology have a similar structure and/or organization to simplify comparisons of the two templates. The comparing engine (706) compares the desired topology template to the current topology template and determines if there are any differences between them. If there are differences, the comparing engine (706) identifies the differences.

The assigning engine (708) assigns roles to control elements, network components, network sections, layer 2 networks, or combinations thereof to implement the desired topology with the existing topology. The assigning engine (708) determines the roles each type of deployed control elements or other network components will play in the desire topology and determines how to interconnect data plane elements and control plane elements and how they will interoperate. If appropriate, additional resources are added to the current topology to implement the desired topology.

As the desired topology is implemented, the controlling system (700) monitors the topology implementations and makes adjustments as appropriate. Such adjustments may be focused on shorter term configurations which deal with specific traffic streams or stream types. The controlling system (700) can use a variety of methods for the shorter term configuration adjustments. The controlling system (700) can be directly involved in a traffic stream to set configuration parameters before the traffic uses the network or indirectly involved by generalizing the configuration of the deployed control elements to instruct the network components on how to handle stream types. For both longer term and shorter term configuration controls, the controlling system (700) can choose which deployed control elements or other network components to supervise, how to utilize each control element, how these control elements will interoperate, and what new control elements are to be deployed.

Figure 8:
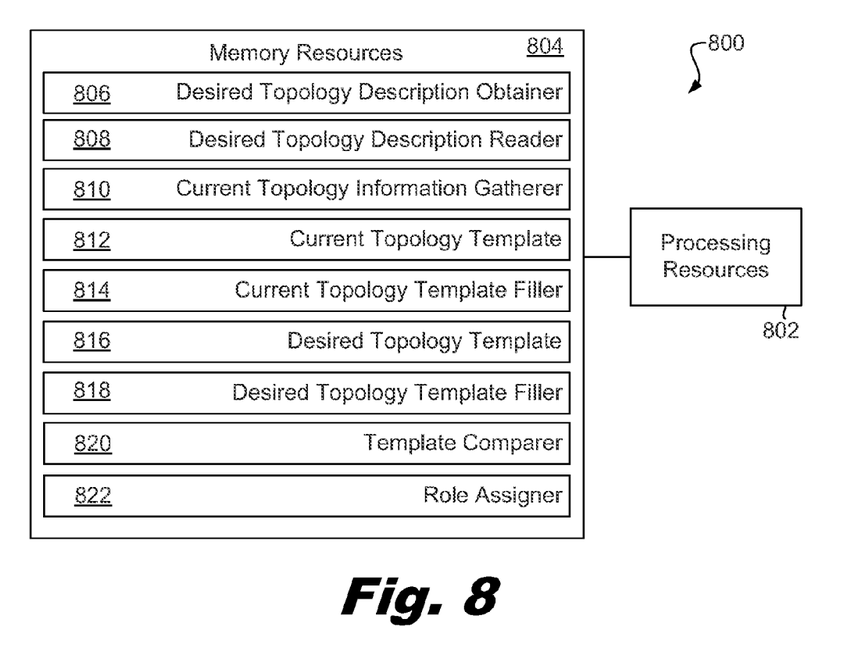
FIG. 8 is a diagram of an example of a controlling system according to the principles described herein.

FIG. 8 is a diagram of an example of a controlling system (800) according to the principles described herein. In this example, the controlling system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the controlling system (800). The programmed instructions shown stored in the memory resources (804) include a desired topology description obtainer (806), a desired topology description reader (808), a current topology information gatherer (810), current topology template filler (814), a desired topology template filler (818), a template comparer (820), and a role assigner (822). The data structures shown stored in the memory resources (804) include a current topology template (812) and a desired topology template (816).

The memory resources (804) include a computer readable storage medium that contains computer readable program code to cause tasks to be executed by the processing resources (802). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The desired topology description obtainer (806) represents programmed instructions that, when executed, cause the processing resources (802) to obtain a description of the desired topology. The desired topology description reader (808) represents programmed instructions that, when executed, cause the processing resources (802) to read the desired topology description. The current topology information gatherer (810) represents programmed instructions that, when executed, cause the processing resources (802) to gather information about the current topology.

The current topology filler (814) represents programmed instructions that, when executed, cause the processing resources (802) to fill out the current topology template (812). The desired topology filler (818) represents programmed instructions that, when executed, cause the processing resources (802) to fill out the desired topology template (816). The template comparer (820) represents programmed instructions that, when executed, cause the processing resources (802) to compare the filled out desired topology template to a filled out current topology template to identify differences there between. The role assigner (822) represents programmed instructions that, when executed, cause the processing resources (802) to assign roles to network components to implement the desired topology with the current topology.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, COs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries and may be accessed from a remote location over a network connection while the programmed instructions are located locally. Thus, the controlling system (800) may be implemented on a user device, on a server, on a collection of servers, or combinations thereof.

The controlling system (800) of FIG. 8 may be part of a general purpose computer. However, in alternative examples, the controlling system (800) is part of an application specific integrated circuit.

Figure 9:
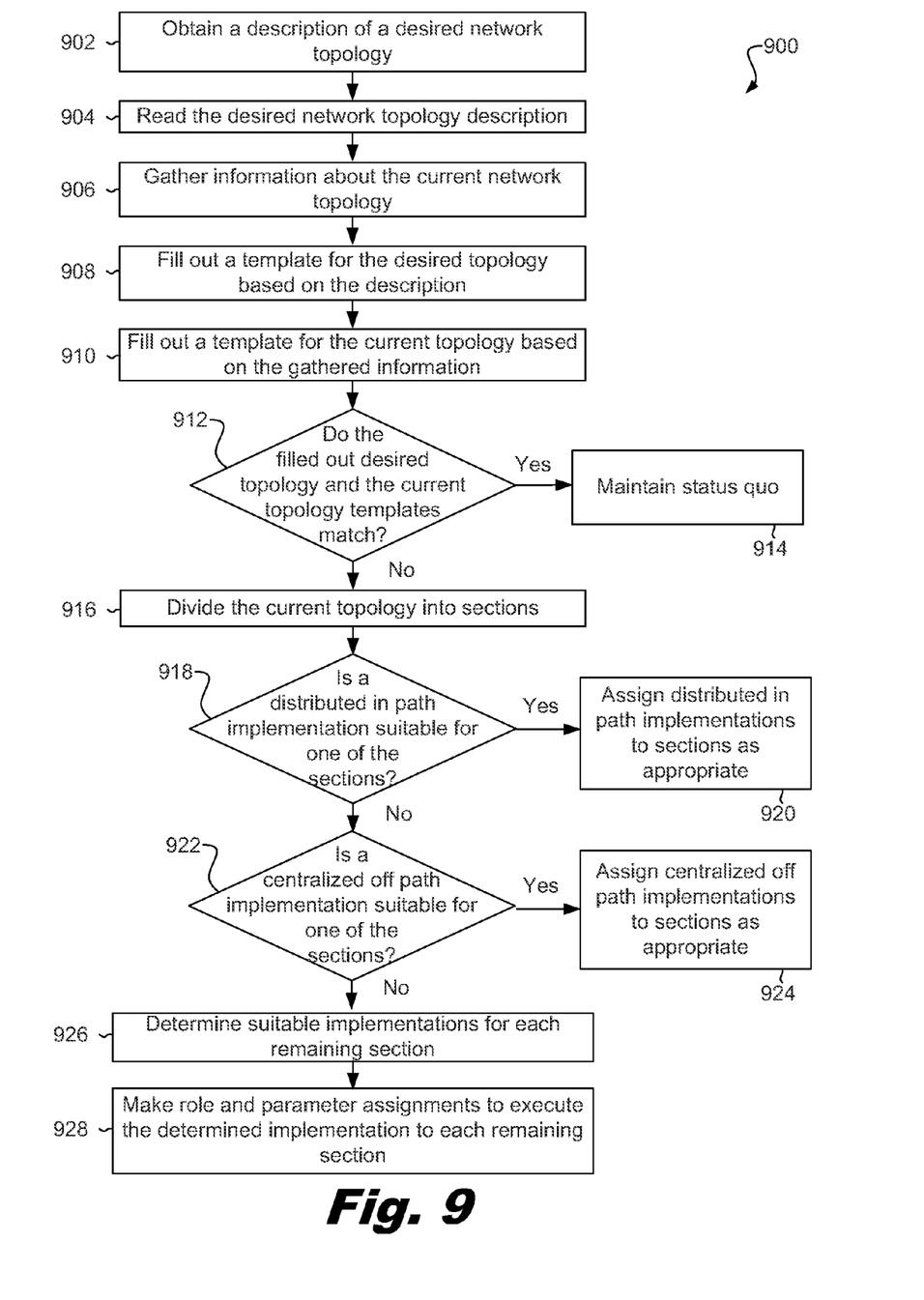
FIG. 9 is a diagram of an example of a flowchart of a process for controlling a topology of a network according to the principles described herein.

FIG. 9 is a diagram of an example of a flowchart (900) of a process for controlling a topology of a network according to the principles described herein. In this example, the process includes obtaining (902) a description of a desired network topology and reading (904) the desired network topology description. In response to reading the description, information is gathered (906) about the current network topology. A template describing the desired topology is filled out (908) based on the description, and another template describing the current topology of the network is filled out (910) based on the gathered information.

The process also includes determining (912) whether the filled out desired topology template and the filled out current topology template match. If they match, the network maintains (914) the status quo by continuing to implement the current topology. However, if they do not match, the current topology is divided (916) into sections. The process includes determining (918) whether a distributed in path implementation is suitable for at least one of the sections. If so, a distributed in path implementation is assigned (920) to the appropriate sections. The process includes determining (922) whether a centralized off path implementation is suitable for at least one of the sections. If so, a centralized off path implementation is assigned (924) to the appropriate sections. Suitable implementations for the remaining sections, if any, are determined (926) and the appropriate roles and parameters are assigned (928) to execute the implementations.

While the examples above have been described with reference to specific sections, network components, and arrangements, any appropriate sections, network components, and/or arrangements may be used in accordance with the principles described herein. Further, while the examples above have been described with reference to specific topology implementations, any appropriate topology implementation may be used in accordance with the principles described herein. The desired topology may cause a single implementation to be implemented across an entire network or portions of thereof. A single implementation may be implemented in multiple areas of the network.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method comprising:
   determining, by a system comprising a processor, a desired topology of a network;
   comparing, by the system, the desired topology to a current topology of the network;
   determining, by the system, whether network components of the current topology are compatible to implement the desired topology; and
   in response to determining that the network components of the current topology are compatible to implement the desired topology, controlling, by the system, the current topology with role assignments and parameter assignments to the network components in the current topology to implement the desired topology with the network components in the current topology.

2. The method of claim 1, wherein the network components of the current topology include a control plane element.

3. The method of claim 1, further comprising adding, by the system, additional network components to the current topology to implement the desired topology.

4. The method of claim 1, wherein determining the desired topology of the network includes gathering information from at least one source about devices capable of implementing the desired topology.

5. The method of claim 4, further comprising filling out a desired topology template with the gathered information.

6. The method of claim 1, wherein comparing the desired topology to the current topology of the network includes gathering information about the current topology.

7. The method of claim 6, further comprising filling out a current topology template with the gathered information.

8. The method of claim 7, wherein comparing the desired topology to the current topology of the network includes comparing a filled out version of the current topology template with a filled out version of a desired topology template.

9. The method of claim 1, wherein controlling the current topology with the role assignments and the parameter assignments to the network components in the current topology to implement the desired topology includes causing the current topology to implement a distributed in path control implementation.

10. The method of claim 1, wherein controlling the current topology with the role assignments and the parameter assignments to the network components in the current topology to implement the desired topology includes causing the current topology to implement a centralized off path control implementation.

11. The method of claim 1, wherein the role assignments comprise assigning roles to respective network components of the current topology.

12. The method of claim 11, wherein the assigned roles comprise a control plane role.

13. The method of claim 1, wherein the parameter assignments comprise assigning parameters to respective network components of the current topology.

14. The method of claim 13, wherein the parameters comprise a parameter relating to a port state, and a parameter relating to a quality of service.

15. The method of claim 14, wherein the parameters further comprise a parameter relating to link aggregation.

16. A system comprising:
a processor; and
a non-transitory storage medium storing instructions executable on the processor to:
obtain a description of a desired topology of a network;
gather information about the desired topology and a current topology of the network;
compare the desired topology to the current topology;
determine whether network components of the current topology are compatible to support the desired topology; and
in response to determining that the network components of the current topology are compatible to support the desired topology, control the current topology with role assignments and parameter assignments to the network components in the current topology to implement the desired topology with the network components.

17. The system of claim 16, wherein the instructions are executable on the processor to cause the current topology to implement a centralized off path control implementation, a distributed in path control implementation, or combinations thereof.

18. The system of claim 16, wherein the instructions are executable on the processor to fill out templates for both the current topology and the desired topology,
wherein the comparing of the desired topology to the current topology comprises comparing the templates for both the current topology and the desired topology.

19. The system of claim 16, wherein the role assignments comprise assigning roles to respective network components of the current topology, the assigned roles comprising a control plane role.

20. The system of claim 16, wherein the parameter assignments comprise assigning parameters to respective network components of the current topology, and wherein the parameters comprise a parameter relating to a port state, and a parameter relating to a quality of service.

21. A non-transitory computer readable storage medium storing instructions that, when executed, cause a system to:
obtain a description of a desired topology of a network;
gather information about the desired topology and a current topology of the network;
fill out a first template for the desired topology and a second template for the current topology;
compare the first and second templates for differences;
in response to the comparing, determine whether network components of the current topology are able to support the desired topology; and
in response to determining that the network components of the current topology are able to support the desired topology, control the current topology with role assignments and parameter assignments to the network components in the current topology to implement the desired topology with the network components.

22. The non-transitory computer readable storage medium of claim 21, wherein the instructions, when executed, cause the system to implement a centralized off path control implementation, a distributed in path control implementation, or combinations thereof.

* * * * *